United States Patent
Shi et al.

(10) Patent No.: US 11,063,815 B2
(45) Date of Patent: Jul. 13, 2021

(54) BUILDING AND FIXING A DYNAMIC APPLICATION TOPOLOGY IN A CLOUD BASED ENVIRONMENT LEVERAGING LOG FILE DATA

(71) Applicant: International Business Machines Corporation, Armonk, NY (US)

(72) Inventors: Shaw-Ben S. Shi, Austin, TX (US); Geetha Adinarayan, Bangalore (IN); Gandhi Sivakumar, Bentleigh (AU); Meng Hong Tsai, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 15/843,832

(22) Filed: Dec. 15, 2017

(65) Prior Publication Data
US 2019/0190773 A1 Jun. 20, 2019

(51) Int. Cl.
*H04L 12/24* (2006.01)

(52) U.S. Cl.
CPC .......... *H04L 41/0677* (2013.01); *H04L 41/12* (2013.01); *H04L 41/145* (2013.01)

(58) Field of Classification Search
CPC ................................ H04L 41/12; H04L 12/24
USPC ........................................................ 709/224
See application file for complete search history.

(56) References Cited

U.S. PATENT DOCUMENTS

| 9,465,685 B2 | 10/2016 | Adinarayan et al. |
| 9,557,879 B1 | 1/2017 | Wang et al. |
| 2007/0055972 A1* | 3/2007 | Brown ...................... G06F 8/61 717/174 |
| 2013/0019008 A1* | 1/2013 | Jorgenson ........... G06F 11/3495 709/224 |
| 2014/0250333 A1 | 9/2014 | Duggan et al. |
| 2014/0304407 A1 | 10/2014 | Moon |
| 2015/0149497 A1 | 5/2015 | Kanjirathinkal et al. |
| 2015/0358391 A1 | 12/2015 | Moon et al. |
| 2016/0132214 A1* | 5/2016 | Koushik ................. H04L 63/10 715/741 |
| 2016/0147529 A1* | 5/2016 | Coleman .................. G06F 8/63 717/120 |
| 2016/0359697 A1 | 12/2016 | Scheib et al. |
| 2016/0378348 A1 | 12/2016 | Uriel |

(Continued)

OTHER PUBLICATIONS

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

(Continued)

*Primary Examiner* — Sibte H Bukhari
(74) *Attorney, Agent, or Firm* — Konrad, Raynes, Davda and Victor LLP; Janaki K. Davda

(57) ABSTRACT

Provided are techniques for building and fixing a dynamic application topology. Log files are received from multiple sources comprising any of services and nodes. Information is extracted from the log files. An application topology is created for a particular point in time for an application that provides hierarchical relationships of components for executing the application using the extracted information. One or more problems in the application topology are identified. A solution is applied to each of the one or more problems.

15 Claims, 9 Drawing Sheets

(56) References Cited

U.S. PATENT DOCUMENTS

2016/0378439 A1    12/2016  Straub et al.
2017/0085447 A1*    3/2017  Chen .................... G06F 16/248
2019/0130008 A1*    5/2019  Nakagoe ............... G06F 16/254

OTHER PUBLICATIONS

Mell, P. and T. Grange, "The NIST Definition of Cloud Computing (Draft)", Sep. 2011, Computer Security Division Information Technology Laboratory National Institute of Standards and Technology, Total 7 pp.

"Best Practices for Deployment Planning" dated Jun. 28, 2011, (online) retrieved from the Internet at URL>https://www.ibm.com/developerworks/community/wikis/home?la . . . , Total 18 pages.

"FutureProof" dated 2017, AppFirst, (online) retrieved from the Internet at URL>http://madefutureproof.com/appfirst-2/ Total 2 pages.

Freet et al., "Cloud Forensics Challenges from a Service Model Standpoint: IaaS, PaaS and SaaS", dated 2015, Proceedings of the 7th International Conference on Management of Computational and Collective intElligence in Digital EcoSystems, Total 8 pages.

Sang et al., "A Log-based Approach to Make Digital Forensics Easier on Cloud Computing", dated 2013, 2013 Third International Conference on Intelligent System Design and Engineering Applications, Total 4 pages.

Schleicher et al., "Smart Fabric—an Infrastructure-Agnostic Artifact Topology Deployment Framework" dated 2015, 2015 IEEE International Conference on Mobile Services, Total 8 pages.

\* cited by examiner

BUILDING AND FIXING A DYNAMIC APPLICATION TOPOLOGY IN A CLOUD BASED ENVIRONMENT LEVERAGING LOG FILE DATA

FIELD

Embodiments of the invention relate to building and fixing a dynamic application topology in a cloud based environment leveraging log file data.

BACKGROUND

In a Platform as a Service (PaaS) environment, an application is created using multiple services. When the application is deployed, a user is unaware of the deployment topology of the application. The deployment topology describes nodes and services used to execute the application. The deployment topology supporting the application may expand and shrink over time. When a problem occurs, finding out where in the deployment topology the problem occurred is difficult.

Existing deployment topology discovery tools depend on configuration files and sensors to detect the deployment topology. This involves establishing a session with each node of the deployment topology and configuring each node to provide detailed deployment topology information. Moreover, the deployment topology generated is not a real time deployment topology as some nodes may be down/unavailable.

A change in or updating of software level often require sensors to be run again to detect the current level of the software.

SUMMARY

In accordance with embodiments, a computer-implemented method is provided for building and fixing a dynamic application topology. The computer-implemented method comprises: receiving log files from multiple sources comprising any of services and nodes; extracting information from the log files; creating an application topology for a particular point in time for an application that provides hierarchical relationships of components for executing the application using the extracted information; identifying one or more problems in the application topology; and applying a solution to each of the one or more problems.

In accordance with other embodiments, a computer program product is provided for building and fixing a dynamic application topology. The computer program product comprising a computer readable storage medium having program code embodied therewith, the program code executable by at least one processor to perform operations comprising: receiving log files from multiple sources comprising any of services and nodes; extracting information from the log files; creating an application topology for a particular point in time for an application that provides hierarchical relationships of components for executing the application using the extracted information; identifying one or more problems in the application topology; and applying a solution to each of the one or more problems.

In yet other embodiments, a computer system is provided for building and fixing a dynamic application topology. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: receiving log files from multiple sources comprising any of services and nodes; extracting information from the log files; creating an application topology for a particular point in time for an application that provides hierarchical relationships of components for executing the application using the extracted information; identifying one or more problems in the application topology; and applying a solution to each of the one or more problems.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
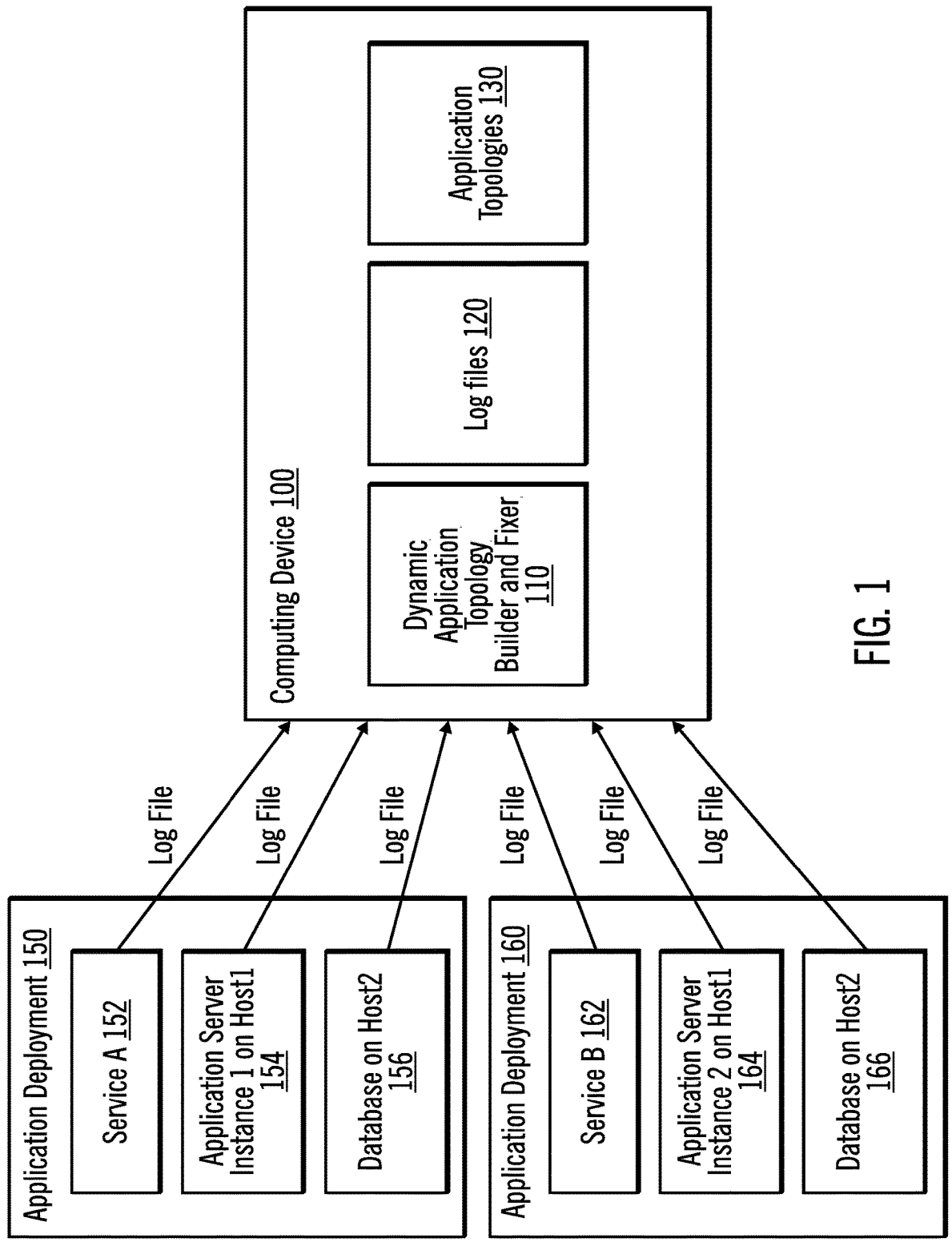
FIG. 1 illustrates, in a block diagram, a computing environment in accordance with certain embodiments.

FIG. 1 illustrates, in a block diagram, a computing environment in accordance with certain embodiments. A computing device 100 includes a dynamic application topology builder and fixer 110, which receives log files 120 and generates topologies 130. FIG. 1 also includes application deployment 150 for one application and application deployment 160 for another application. The application deployment 150 includes a service A 152 (e.g., a cloud service, such as to provide news, stock quotes, day trader information, etc.), an application server instance 1 on host 1 154, and a database on host 2 156. The application deployment 160 includes a service B 162 (e.g., a cloud service, such as to provide news, stock quotes, day trader information, etc.), an application server instance 2 on host 1 164, and a database on host 2 166.

The service A 152 and the service B 162 are applications. With embodiments, service A 152 and service B 162 may be the same or different service.

The application server instance 1 on host 1 154, the database on host 2 156, the application server instance 2 on host 1 164, and the database on host 2 166 may be referred to as nodes.

Each application deployment 150,160 is any combination of nodes and services for executing an application. Also, the application deployments 150, 160 are provided herein as examples, but any combination of nodes and services for executing an application may be used in an application deployment in various embodiments. Each of the nodes and services of the application deployments 150,160 sends log files to the dynamic application topology builder and fixer 110. The dynamic application topology builder and fixer 110 stores the log files 120 and uses them to build topologies for the application deployments 150, 160.

With embodiments, the log files 120 are leveraged to discover topology information such as Internet Protocol (IP) addresses of a node, an Operating System (OS) running on that IP address, software running on that IP address, applications supported by the node, and the node's dependency on other nodes.

Figure 2:
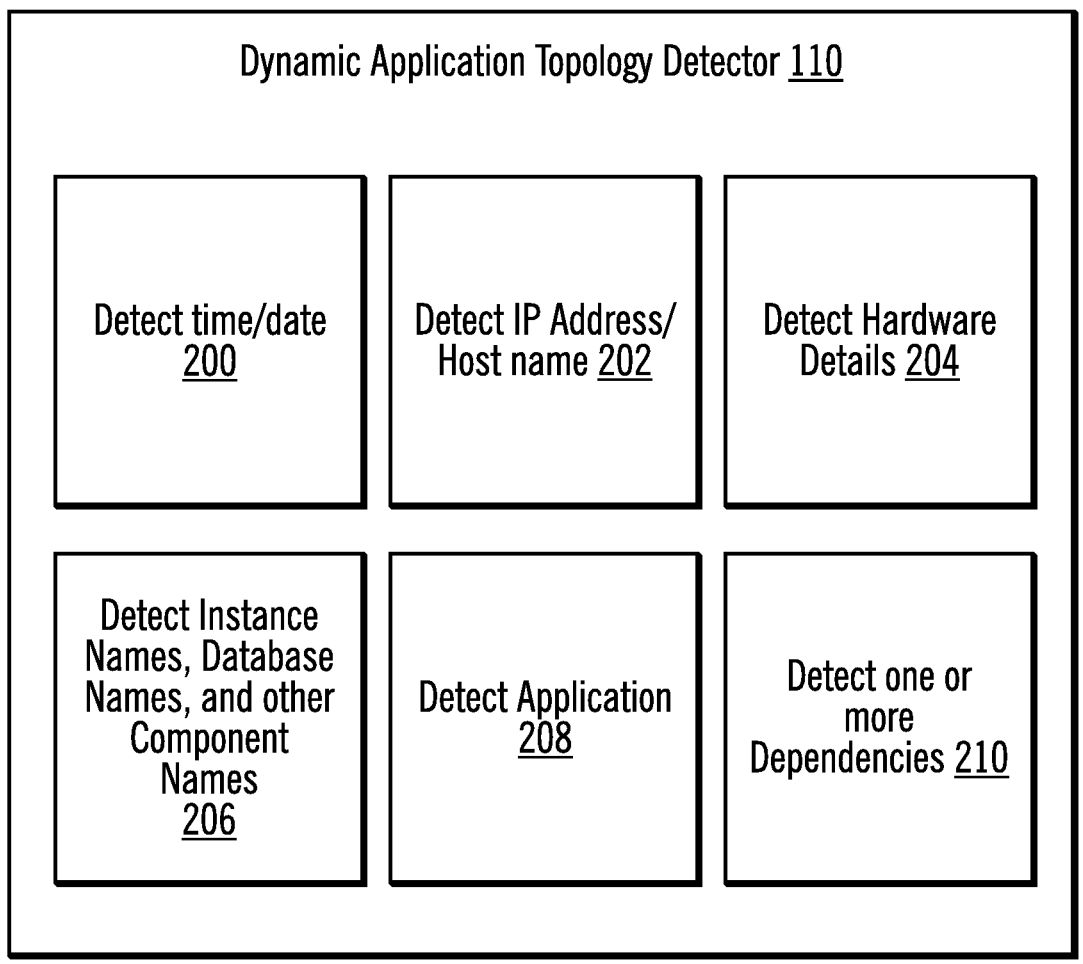
FIG. 2. illustrates further details of a dynamic application topology builder and fixer in accordance with certain embodiments.

FIG. 2. illustrates further details of the dynamic application topology builder and fixer 110 in accordance with certain embodiments. The dynamic application topology builder and fixer 110 detects a time and date 200 in a log line (i.e., an entry of a log file) of a log file, detects an IP address and host name 202, detects hardware details 204, detects instance, database, and other component names 206, detects an application 208 (e.g., including detecting an application name), and detects one or more dependencies 210 (e.g., calls to other components or nodes). With embodiments, nodes may be described as hosts (e.g., application servers and databases) and components may be described as software components (e.g., a User Interface (UI), a messaging component, a notification component, etc.).

In certain embodiments, the dynamic application topology builder and fixer 110 parses each log line coming in from the nodes and has a rule based components to detect the a) time in the log line, b) the IP/hostname from which the log line came, c) hardware details (e.g., Virtual Machine (VM) or server name, serial number, etc.), d) instance, database and other component names, e) calls to other components, f) application name, and optionally other information.

Figure 3:
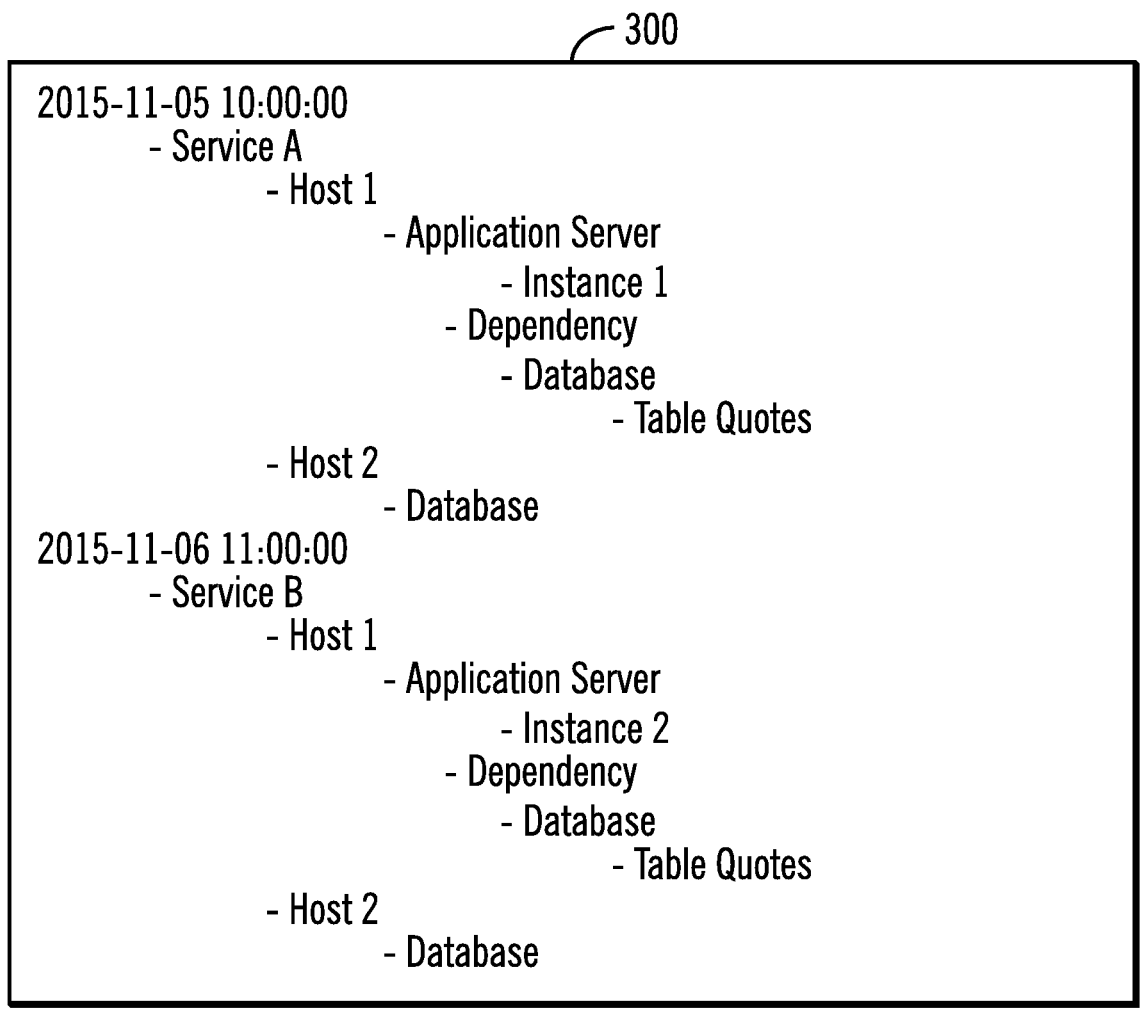
FIG. 3 illustrates an example application topology in accordance with certain embodiments.

FIG. 3 illustrates an example topology 300 for application deployments 150, 160 of FIG. 1 in accordance with certain embodiments. In FIG. 3, the application topology 300 is hierarchical. At time/date 2015-11-05 10:00:00, service A was executing on host 1, which includes application server instance 1. The application server instance 1 has a dependency on the database, which includes table quotes. Also, service A was executing on host 2, which includes the database. At time/date 2015-11-06 11:00:00, service B was executing on host 1, which includes application server instance 2. The application server instance 2 has a dependency on the database, which includes table quotes. Also, service B was executing on host 2, which includes the database.

Figure 4:
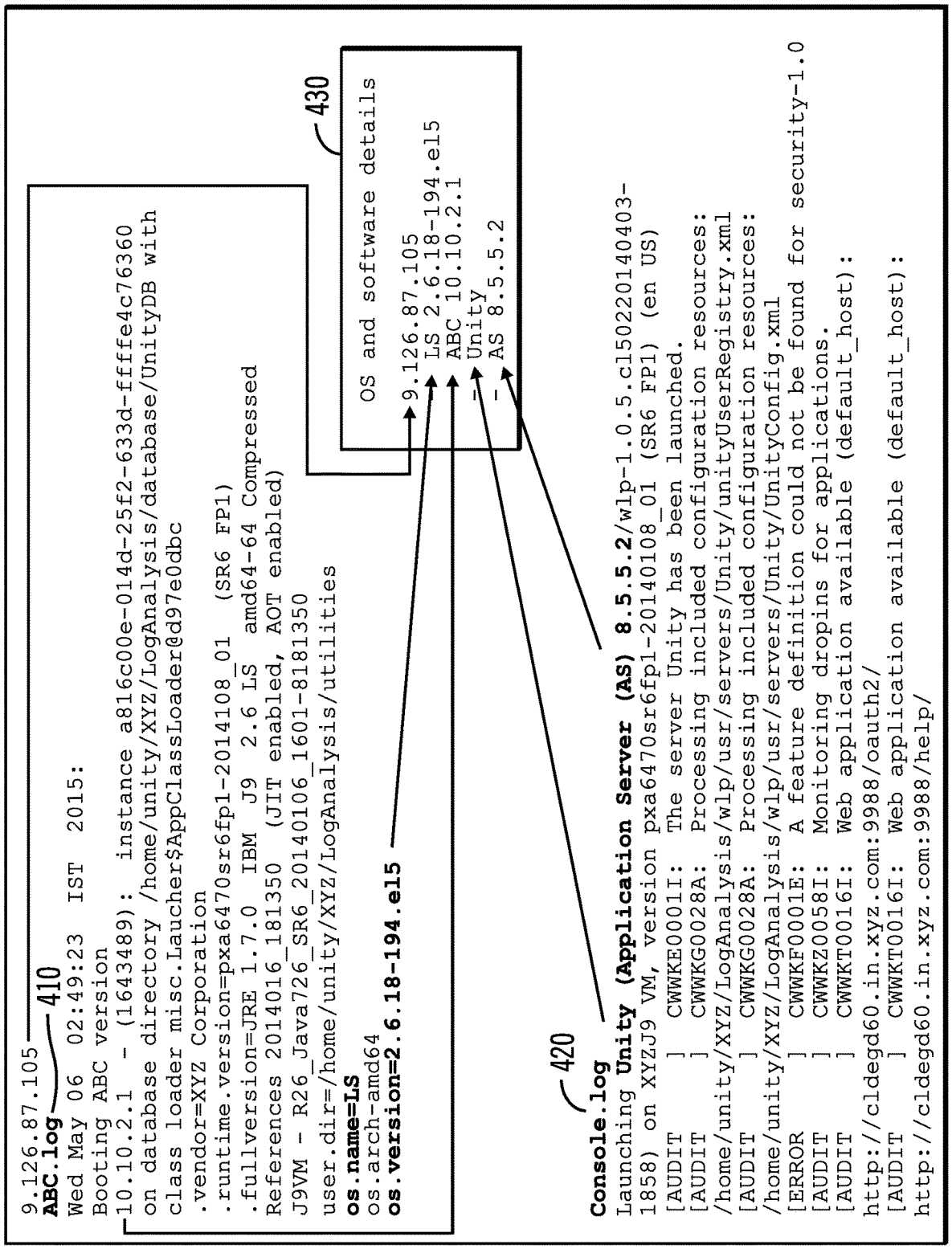
FIG. 4 illustrates an example of using log files to generate an application topology in accordance with certain embodiments.

FIG. 4 illustrates using log files to generate an application topology in accordance with certain embodiments. In particular, the ABC.log file 410 and the console.log file 420 are received by the dynamic application topology builder and fixer 110. The dynamic application topology builder and fixer 110 uses the ABC.log file 410 and the console.log file 420 to generate the application topology 430 with Operating System (OS) and software details 430. In this example, the OS name is "LS" and the OS version is "2.6.18-194.e15". In this example, the software details include the application name "ABC" and version "10.10.2.1", the Application Server (AS) instance name "Unity", and AS instance version "8.5.5.2".

In certain embodiments, there may not be direct information in the log file. For example, the log file may not state that there is a connection/call to a database instance DBINSTANCE1. Instead, there may be a line stating "writing to table Quotes" in one log file and there may be a line stating "creating table QUOTES" in another log file. The dynamic application topology builder and fixer 110 leverages common keys (e.g., table names, software component names, application names, etc.) to identify topology details to reflect real time topology, including application dependency.

Figure 5:
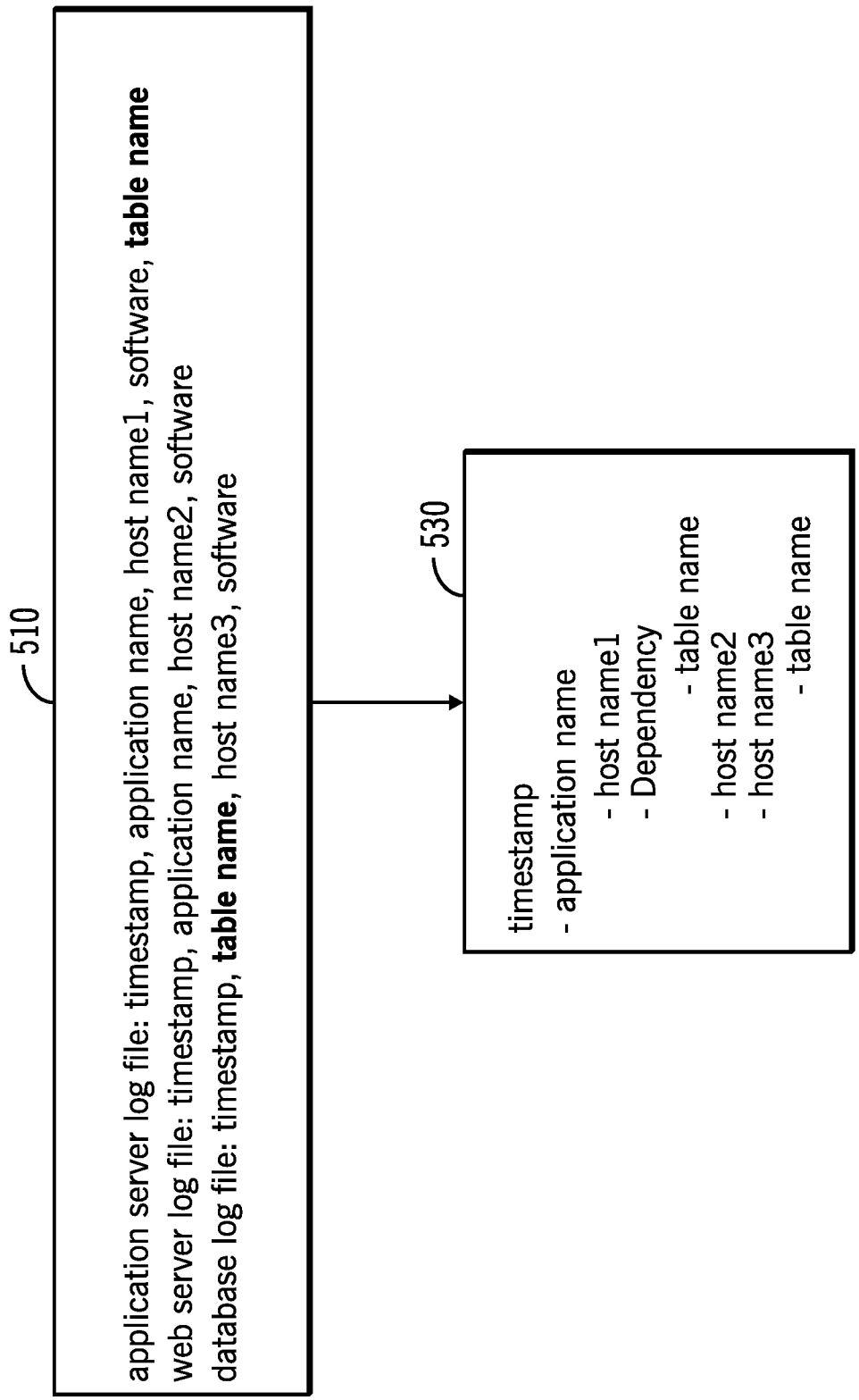
FIG. 5 illustrates another example of using log files to generate an application topology in accordance with certain embodiments.

FIG. 5 illustrates another example of using log files to generate an application topology in accordance with certain embodiments. In FIG. 5, the dynamic application topology builder and fixer 110 receives log files that have the log lines 510 and generates the application topology 530. For example, the applicant name, hostname1, hostname2, hostname3, and tablenames are determined from the log lines 510. Thus, the dynamic application topology builder and fixer 110 may generate the indirect information from the log files.

With embodiments, after detecting that at least one of the application topology components is updated/inserted into the application topology based on a set hierarchy, the dynamic application topology builder and fixer 110 updates the application topology. With embodiments, the hierarchy is: application→host→middleware (e.g., application server or database). When the dynamic application topology builder and fixer 110 finds a host, the host is placed under an application in the application topology. When the dynamic application topology builder and fixer 110 finds middleware, the middleware is placed under the host in the application topology.

For example, given an application, a host, software, a software component, and a dependency, if at time t1, host1 may be hosting application server instance1 and service A and at time t2, host1 may be hosting application server instance2 and service B. Because embodiments update the application topology based on time, the dynamic application topology builder and fixer 110 is able to provide a current (real time) view of the application topology.

Figure 6:
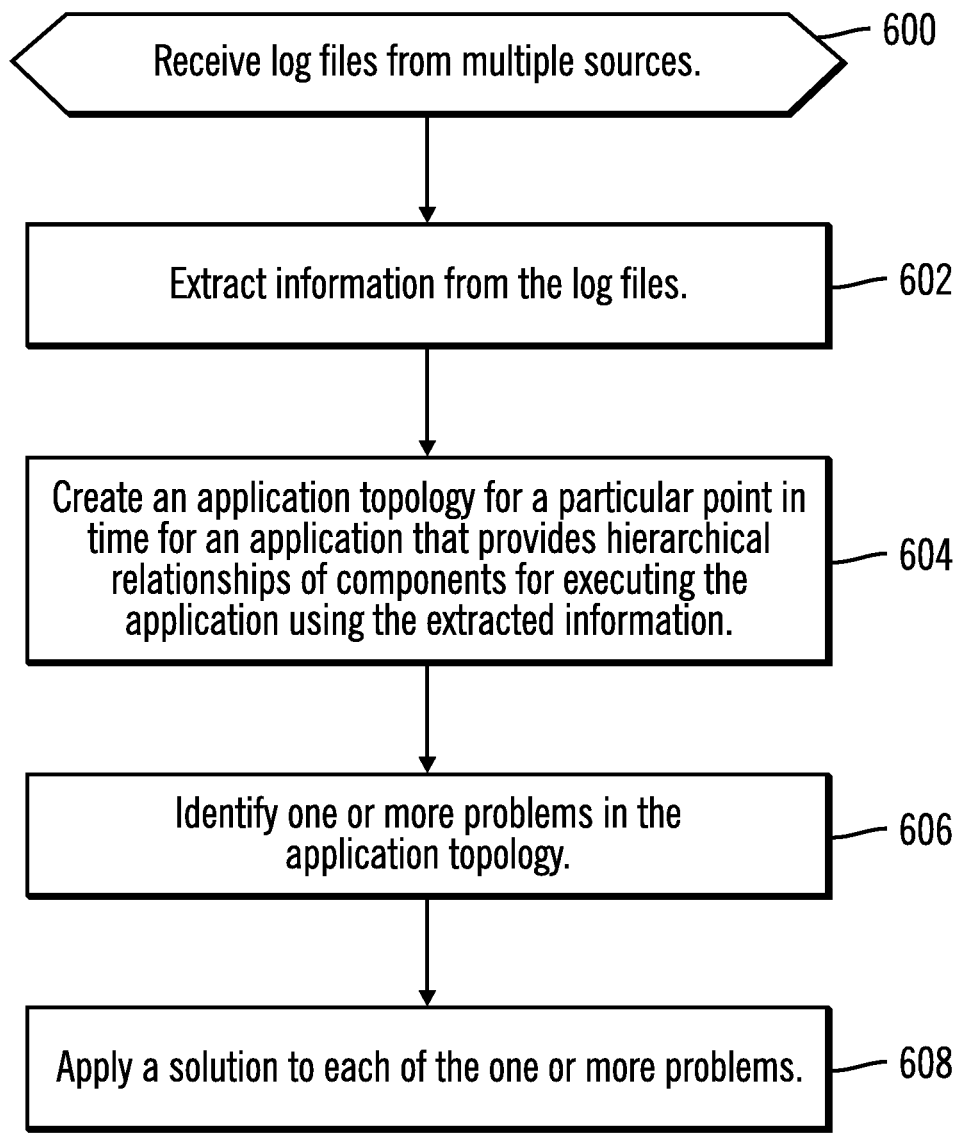
FIG. 6 illustrates, in a flow chart, operations for building and fixing problems in an application topology in accordance with certain embodiments.

FIG. 6 illustrates, in a flow chart, operations for building and fixing problems in an application topology in accordance with certain embodiments. Control begins at block 600 with the dynamic application topology builder and fixer 110 receiving log files from multiple sources (i.e., any combination of services and/or nodes). In certain embodiments, the dynamic application topology builder and fixer 110 generates the application topology as log lines are received, rather than entire log files. In block 602, the dynamic application topology builder and fixer 110 extracts information from the log files. In block 604, the dynamic application topology builder and fixer 110 creates an application topology for a particular point in time for an application that provides hierarchical relationships of components for executing the application using the extracted information. In block 606, the dynamic application topology builder and fixer 110 identifies one or more problems in the application topology. For example, the dynamic application topology builder and fixer 110 may use rules to identify problems. In certain embodiments, the log file contains errors and error codes stating a possible root cause that is used to map to a solution. In block 606, the dynamic application topology builder and fixer 110 applies a solution to each of the one or more problems. For example, the dynamic application topology builder and fixer 110 may use rules to identify the solutions (e.g., for error code x, apply solution y). With embodiments, this fixes the one or more problems. For example, if application server instance 1 is coupled to host 1 and application server instance 1 becomes unavailable (problem), the dynamic application topology builder and fixer 110 may restart application server instance 1 (solution).

By using log files to dynamically build the application topology, identify problems, and apply solutions to fix the problems, embodiments efficiently use log files to fix problems in an application deployment to lead to more efficient execution of the application.

Most of the services making the application generate logs. Infrastructure, middleware hosting these applications also generates logs. The log data contains topology information that may be leveraged to build the near real time application topology that may be leveraged for problem determination.

Embodiments build dynamic application topology in cloud based environment leveraging log file data. In particular, embodiments detect various topology related details and update the application topology information in near real time and continuously in a log analysis server (such as computing device 100) within a multi-node PaaS system, by parsing through each log line coming in and detecting, using at least one rule based component information for the application topology.

Moreover, embodiments create the application topology to reflect real time topology including application dependency by leveraging common keys and updating each topology component based on a set hierarchy.

Figure 7:
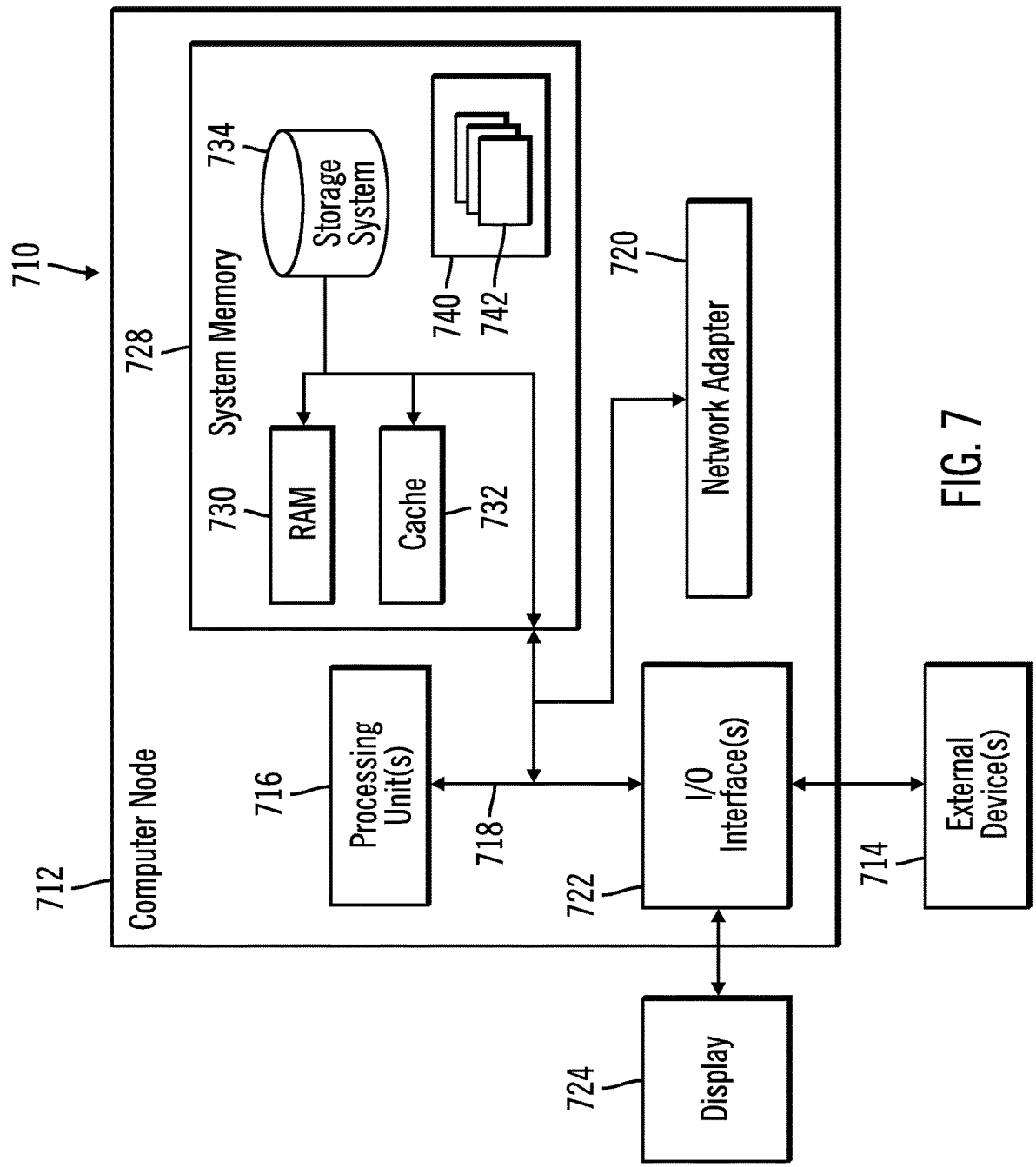
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the computing device 100 and nodes have the architecture of computer node 712. In certain embodiments, the computing device 100 and/or nodes are part of a cloud infrastructure. In certain alternative embodiments, the computing device 100 and/or nodes not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
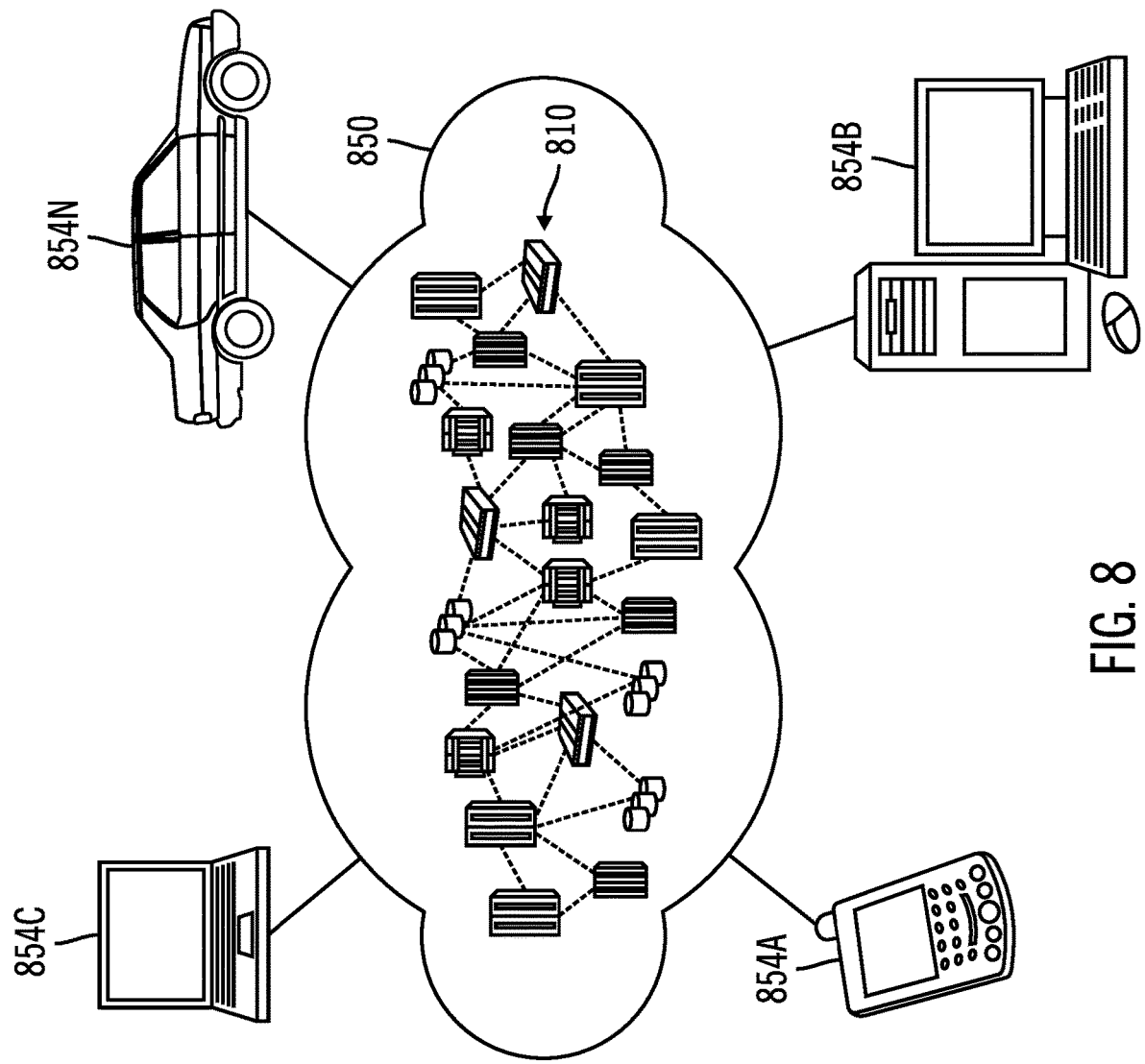
FIG. 8 illustrates a cloud computing environment in accordance with certain embodiments.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
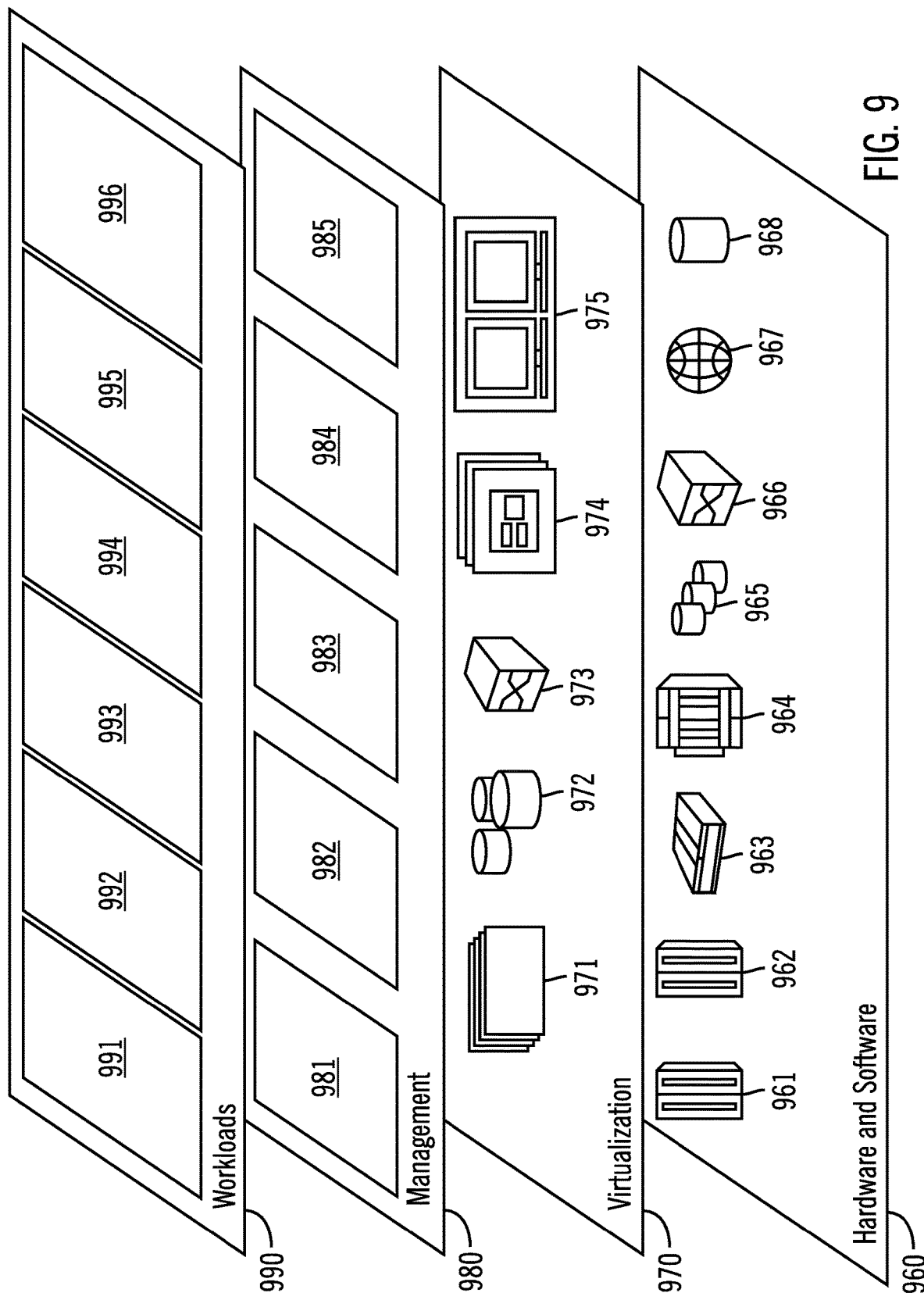
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and building and fixing a dynamic application topology 996

Thus, in certain embodiments, software or a program, implementing building and fixing a dynamic application topology in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
   receiving log files from each application and each node of an application deployment, wherein each node comprises one of an application server instance and a database;
   building an application topology in near real time by:
   extracting information from the log files, wherein the extracted information comprises a time and date of a log file, an application name of an application, a host name of a host, at least one node, and one or more dependencies of the at least one node to another node, wherein a dependency of the one or more dependencies is based on a call from the at least one node to the another node, and wherein common keys are used to identify the one or more dependencies; and
   creating the application topology using the extracted information for a particular point in time for a particular application, wherein the application topology provides hierarchical relationships of components for executing the particular application, and wherein the application topology is a hierarchy that is created by:
   placing the application in the application topology;
   placing the host under the application;
   placing the at least one node under the host; and
   placing the dependency under the at least one node;
   identifying one or more problems in the application topology; and
   applying a solution to each of the one or more problems.

2. The computer-implemented method of claim 1, wherein the extracted information further comprises an Internet Protocol address, hardware details, an application server instance name, and a database name.

3. The computer-implemented method of claim 1, further comprising operations for:
   updating the application topology in near real time and continuously.

4. The computer-implemented method of claim 1, further comprising operations for:
   updating at least one component of the components of the application topology based on a set hierarchy.

5. The computer-implemented method of claim 1, wherein a Software as a Service (SaaS) is configured to perform the operations of the computer-implemented method.

6. A computer program product, the computer program product comprising a computer readable storage medium having program code embodied therewith, the program code executable by at least one processor to perform operations comprising:
   receiving log files from each application and each node of an application deployment, wherein each node comprises one of an application server instance and a database;
   building an application topology in near real time by:
   extracting information from the log files, wherein the extracted information comprises a time and date of a log file, an application name of an application, a host name of a host, at least one node, and one or more dependencies of the at least one node to another node, wherein a dependency of the one or more dependencies is based on a call from the at least one node to the another node, and wherein common keys are used to identify the one or more dependencies; and
   creating the application topology using the extracted information for a particular point in time for a particular application, wherein the application topology provides hierarchical relationships of components for executing the particular application, and wherein the application topology is a hierarchy that is created by:
   placing the application in the application topology;
   placing the host under the application;
   placing the at least one node under the host; and
   placing the dependency under the at least one node;
   identifying one or more problems in the application topology; and
   applying a solution to each of the one or more problems.

7. The computer program product of claim 6, wherein the extracted information further comprises an Internet Protocol address, hardware details, an application server instance name, and a database name.

8. The computer program product of claim 6, wherein the program code is executable by the at least one processor to perform operations comprising:
   updating the application topology in near real time and continuously.

9. The computer program product of claim 6, wherein the program code is executable by the at least one processor to perform operations comprising:
   updating at least one component of the components of the application topology based on a set hierarchy.

10. The computer program product of claim 6, wherein a Software as a Service (SaaS) is configured to perform the operations of the computer program product.

11. A computer system, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more computer-readable memories, to perform operations comprising:
   receiving log files from each application and each node of an application deployment, wherein each node comprises one of an application server instance and a database;
   building an application topology in near real time by:
      extracting information from the log files, wherein the extracted information comprises a time and date of a log file, an application name of an application, a host name of a host, at least one node, and one or more dependencies of the at least one node to another node, wherein a dependency of the one or more dependencies is based on a call from the at least one node to the another node, and wherein common keys are used to identify the one or more dependencies; and
      creating the application topology using the extracted information for a particular point in time for a particular application, wherein the application topology provides hierarchical relationships of components for executing the particular application, and wherein the application topology is a hierarchy that is created by:
      placing the application in the application topology;
      placing the host under the application;
      placing the at least one node under the host; and
      placing the dependency under the at least one node;
   identifying one or more problems in the application topology; and
   applying a solution to each of the one or more problems.

12. The computer system of claim 11, wherein the extracted information further comprises an Internet Protocol address, hardware details, an application server instance name, and a database name.

13. The computer system of claim 11, wherein the operations further comprise:
   updating the application topology in near real time and continuously.

14. The computer system of claim 11, wherein the operations further comprise:
   updating at least one component of the components of the application topology based on a set hierarchy.

15. The computer system of claim 11, wherein a Software as a Service (SaaS) is configured to perform the operations of the computer system.

* * * * *